Feb. 23, 1932.  F. M. ROEHL ET AL  1,846,659
CUTTER FOR DOUGHNUT FORMERS
Filed May 31, 1929   2 Sheets-Sheet 1
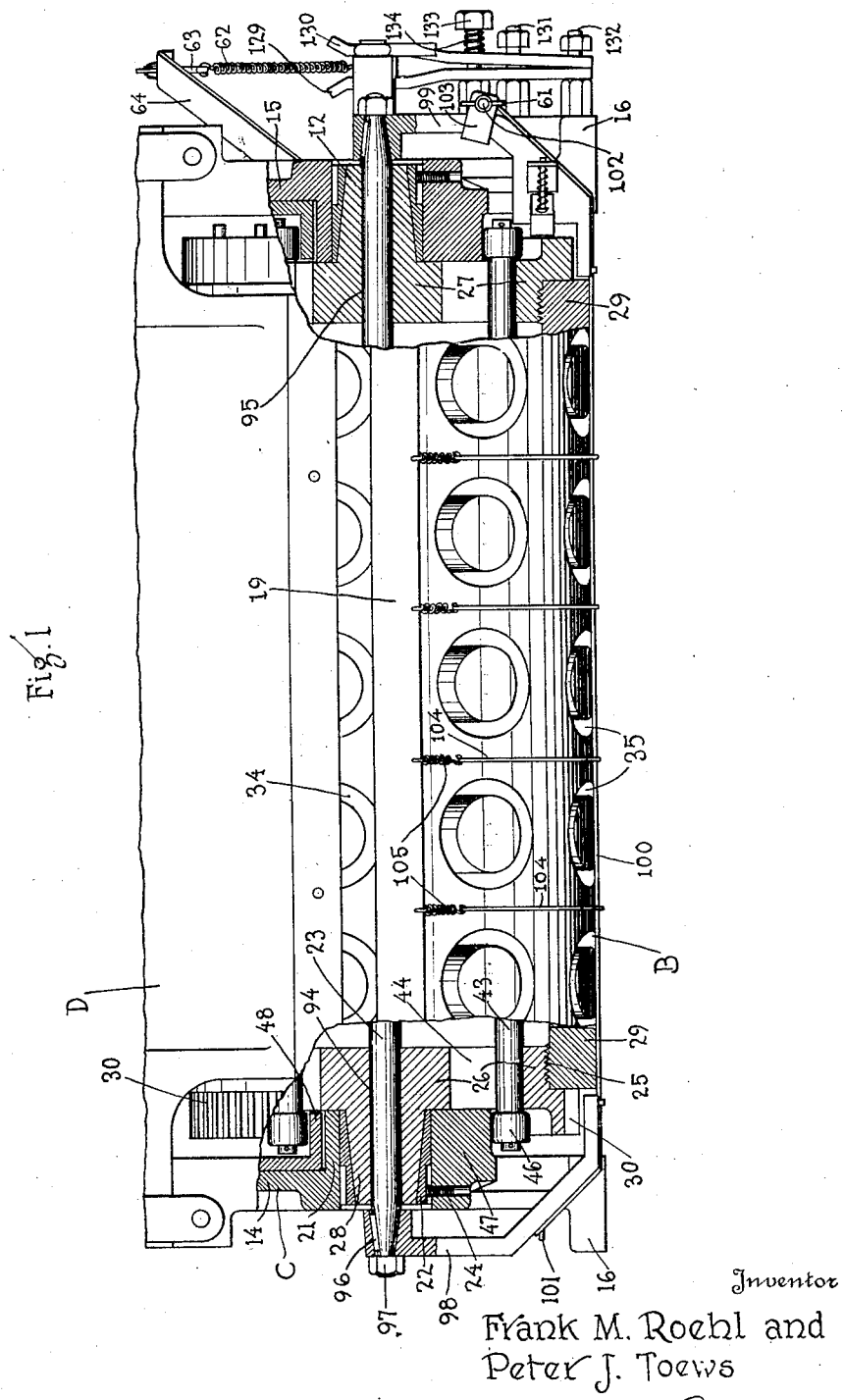
Inventor
Frank M. Roehl and
Peter J. Toews
By Canwell & Sagaard
Attorneys

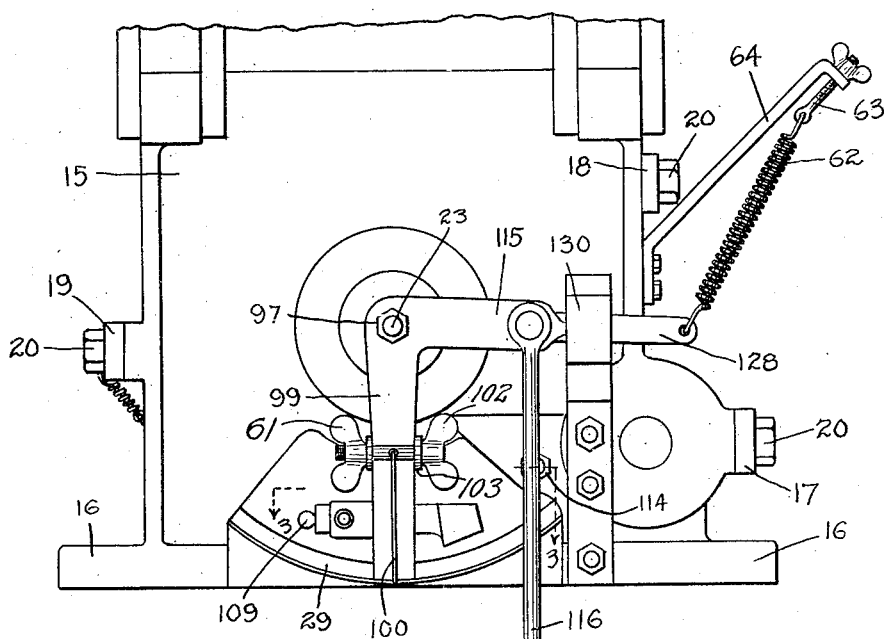

Patented Feb. 23, 1932

1,846,659

UNITED STATES PATENT OFFICE

FRANK M. ROEHL AND PETER J. TOEWS, OF MINNEAPOLIS, MINNESOTA, ASSIGNORS TO NATIONAL AUTOMATIC DOUGHNUT MACHINE COMPANY, OF MINNEAPOLIS, MINNESOTA, A CORPORATION OF MINNESOTA

CUTTER FOR DOUGHNUT FORMERS

Application filed May 31, 1929. Serial No. 367,238.

Our invention relates to cutters for doughnut machines, and has for its object to provide a cutter for freeing the doughnuts from the former cylinder after the same have been ejected therefrom.

Another object of the invention resides in constructing the cutter so as to cause the doughnuts to assume the desired shape after the doughnuts leave the former.

A still further object of the invention resides in acuating the doughnut cutter from the former so as to insure the proper corelation of operation of former and cutter.

A feature of the invention resides in employing a former from which the doughnuts may be discharged by gravity, and in partially freeing the doughnuts from the former to permit the same to become elongated before dropping so as to compensate for the flattening thereof caused by the passage of the cutter through the formed doughnut during the severing of the same.

An object of the invention resides in constructing the former in the shape of a cylinder having annular cavities through which the doughnut dough is forced to give it the desired shape, and in employing a cutter movable along the periphery of the cylinder for freeing the formed doughnut therefrom, said cutter including a shaft coaxial with the cylinder of the former and radial arms attached thereto for supporting the cutter proper.

Another object of the invention resides in providing one of the arms with a pivoted dog and in providing the cylinder with pins adapted to engage said dog for rotating the cutter together with said cylinder.

A still further object of the invention resides in providing said dog with a cam, and in constructing the former with a member adapted to engage said cam to release the cutter so as to cause the same to move through the action of gravity to free the doughnut from the former.

Another object of the invention resides in providing means for stopping the movement of the cutter prior to the complete severing of the doughnut from the former, so as to permit of the elongation thereof.

Other objects of the invention reside in the details of construction thereof, and in the novel combination and arrangement of parts hereinafter illustrated or described.

In the drawings:

Fig. 1 is a side elevational view of a portion of a doughnut former illustrating our invention applied thereto and showing a portion of the former in section.

Fig. 2 is an end elevational view of the structure shown in Fig. 1.

Fig. 3 is a fragmentary plan sectional view taken on line 3—3 of Fig. 2.

Fig. 4 is a fragmentary cross-sectional view of the device taken through the center of the machine.

For the purpose of illustrating an application of our invention, we have shown in the drawings a doughnut former such as disclosed in the application of Frank M. Roehl, Ser. No. 318,840, filed November 12, 1928. This former comprises primarily a cylinder B mounted for rotation in a frame work C. A feeding device D superimposes the cylinder B and operates in conjunction therewith to feed the dough to the cylinder from a suitable hopper or other desirable structure where the same is formed into the desired form.

The frame work C for supporting the various parts of the invention comprises two end frame members 14 and 15 which are formed with feet 16 adapted to rest upon the supporting structure of the doughnut machine proper with which the invention is used. These end frame members are connected together by means of a number of longitudinal bars 17, 18 and 19 which are attached thereto through bolts 20.

The cylinder B comprises a hollow elongated cylindrical shell 29 which is threaded at its two ends as indicated at 25 to receive two end plates 26 and 27. These end plates are constructed with outwardly extending trunnions 28 and 12 which are of conical formation. Near the centers of the end frame members 14 and 15 are formed bosses 21 which are bored to receive conical bushings 22 which are rigidly held in place within the said bosses by means of set screws 24.

The bushings 22 form bearings for the trunnions 28 and serve to rotatably support the cylinder B.

The cylinder B may be driven in any suitable manner as by means of a spur gear 30 formed on the end plate 26 supporting one end of the cylindrical shell 29. This spur gear may mesh with other gearing connected to any suitable source of power and may be operated to drive the cylinder B at a uniform rate of speed.

The cylindrical shell 29 forming part of the cylinder B is constructed with a number of annular cylindrical chambers or bores 35 which are adapted to receive annular pistons 34 movable therein. These pistons are operated in groups through a number of operating rods 43 which pass through radial slots 44 in the end plates 26 and 27 and terminate in rollers 46 concentrically mounted for rotation at the ends of said rods. These rollers are all arranged to successively engage cams 47 and 48, by means of which the said rods and the pistons 34 operated therefrom may be successively reciprocated within the bores or cylinders 35 to cause the ends of said pistons to lie flush with the outer surface of the cylindrical shell 29 or to be receded therein to receive the dough for forming the doughnut proper. This construction, having been more fully disclosed in detail in the application for patent above specified, has only been briefly described in this application.

In the operation of the doughnut former, the dough is directed into the feeding device D from which the same is forced into the pockets formed by the cylinders 35 when the pistons are at their innermost position. This occurs when the cylinders are immediately opposite the discharge outlet of the said feeding device. When the cylinders approach the lowermost portion of their path of travel, the cams 47 operate to eject the formed doughnut therein from the pockets formed by the cylinders 35, the formed doughnut clinging to the structure of the cylinder B due to the consistency of the dough mixture causing the same to adhere thereto.

The present invention relates particularly to the construction whereby the doughnuts so formed may be rapidly and effectively freed from the forming device, and will now be described in detail.

The trunnions 28 and 12 of the cylinder B are centrally bored at 94 and 95 to rotatably support a longitudinal shaft 23. This shaft extends outwardly beyond the end frame members 14 and 15 and has secured to it by means of keys 96 and nuts 97 a pair of downwardly extending arms 98 and 99 which terminate in proximity to the periphery of the cylindrical shell 29 at the bottom of the same.

A steel wire 100 is attached to the arm 98 by means of a lug 101 formed thereon while the said wire is similarly attached to the arm 99 by means of a screw 102 on which the end of the said wire is wound. This screw passes through an attaching device 103 which is secured to the said arm and is held from movement thereon through a lock nut 61. By means of this construction, the screw 102 may be tightened to give any desired tension to wire 100 while the lock nut 61 serves to hold the wire in proper adjusted position.

For retaining the wire in close contact with the surface of the cylindrical shell 29, we employ a plurality of peripheral wires 104 which are secured to the bars 18 and 19 through tension coil springs 105. Upon oscillating the shaft 23, the wire 100 is caused to move along the periphery of the cylinder B and is held in contact therewith throughout its movement by means of said wires 104.

For actuating the wire cutter 100, a dog 107 is employed which is pivoted to the arm 99 through a pin 108 so as to oscillate in a direction toward and from the end plate 26 of cylinder B. Along the outer margin of this end plate is provided a plurality of outwardly projecting pins 109 corresponding in number to the number of rows of doughnut forming pockets 35 which, when the dog is oscillated to one of its extreme positions, as shown in Fig. 3 are adapted to engage the butt end 110 of said dog and to impart rotational movement to the cutter in the same direction as the travel of the said cylinder while said cylinder is being rotated. These pins are so positioned that motion is imparted to the cutter wire 100 when the same is in a position immediately in advance of one of the doughnut forming pockets 35. A compression coil spring 111, seated at one end against the dog 107 and at its other end against a bracket 112 secured to arm 99, serves to hold the end 110 of dog 107 in a position to be engaged by any of the pins 109. The other end of the dog 107 is formed with a cam member 113 which is adapted to engage the end of an adjusting screw 114 threaded into the end frame member 15 and projecting in the path of movement of said cam member. This screw serves to oscillate the dog 107 upon its axis and to disengage the butt end 110 thereof from engagement with the pins 109 allowing the cutter to be moved back to its normal position.

For causing the return movement of the cutter 110 to normal position, the arm 99 is constructed with an outwardly extending lever 115, which has pivoted to it a depending rod 116 carrying one or more weights 117. These weights, acting upon the lever 115, cause the shaft 23 to rotate rapidly in a direction opposite to the direction of rotation of the cylinder B. The reverse movement of shaft 23 causes the cutter 100 to travel between the guide wires 104 and the cylinder in a manner to free the doughnuts from the cylinder. On the return movement, the cutter travels with the cylinder B, and upon reaching the end of its path of travel, the cam member 113 of dog 107 again engages the screw 114 to free the cutter and permit the same to effect the freeing of the doughnut before the succeeding pin 109 carries the cutter around as before.

For the purpose of braking the action of the cutter, the extreme end 115 which is indicated at 128 is caused to move between two fingers 129 and 130 which are arranged to frictionally engage said lever end. These fingers are loosely mounted on two studs 131 and 132 secured to the end frame member 15 and are yieldably forced toward one another by means of a bolt 133 having a compression coil spring 134 positioned between the bolt head and the finger 130. The fingers 129 and 130 are preferably spread at their upper ends so as to receive the portion 128 of lever 115 for the desired purpose.

In addition to the braking fingers 129 and 130, we employ a tension coil spring 62 which is secured at one end to the extreme end of the portion 128 of lever 115 and at its other end to an adjusting bolt 63 adjustably mounted in the end of a bracket 64 attached to the end frame member 15. This spring is so tensioned and is of such a length that, when the dog 107 is released, the said spring stops the movement of the wire cutter 100 just prior to the complete severing of the doughnut from the cylinder B. In the cutting of the doughnut, the wire 100 being forced bodily through the same, the doughnut is somewhat flattened, taking the shape of an ellipse rather than a circle. However, by stopping the movement of the cutter before the doughnut is completely freed, the severed portion of the doughnut drops by gravity causing the same to become elongated and to assume its original circular shape. As the cylinder B continues to revolve, the same moves relative to the wire cutter 100 and completes the freeing of the doughnut from the cylinder proper, leaving the doughnut in a perfectly circular shape upon being discharged from the former. In this manner, a doughnut of perfect shape and size may be readily formed.

Our invention operates in a positive and effective manner to accurately form the doughnuts both as to size and shape. The cutter device is actuated by the cylinder so that the same is perfectly timed with relation thereto, and operates upon the doughnuts at exactly the same time, thereby causing the doughnuts to be delivered at the proper time to be received by the conveying machinery within the cooking apparatus, and also to be of exactly the desired size and weight. The device can be readily taken apart for cleaning and repairing and the cutter may be readily adjusted to take up the slack therein. The cutter is, at all times, caused to travel in immediate proximity to the surface of the cylinder so as to accurately sever the doughnuts from the cylinder. With our invention, practically no waste occurs.

Changes in the specific form of our invention, as herein disclosed, may be made within the scope of what is claimed without departing from the spirit of our invention.

Having described our invention, what we claim as new and desire to protect by Letters Patent is:

1. In combination with a doughnut former having a discharge outlet from which the formed doughnuts freed therefrom may fall by gravity, a cutter adapted to move across said discharge outlet to free the doughnuts from said former, means for first moving said cutter partially across said outlet to permit the doughnuts to elongate and for thereafter moving said cutter completely across said outlet to free the doughnut.

2. In combination with a doughnut former having a member formed with a discharge outlet from which the formed doughnuts freed therefrom may fall by gravity, a cutter adapted to move across said discharge outlet to free the doughnuts from said former, means for moving said cutter and member relative to one another, and a stop for stopping the relative movement of said cutter and member prior to the complete freeing of the doughnut from the former.

3. In combination with a doughnut former having a cylinder formed with a discharge outlet, a shaft coaxially journalled with respect to said cylinder, arms secured to said shaft, a cutter secured to said arms and following along the surface of said cylinder for freeing the doughnuts discharged from said outlet, and guide members following along the periphery of said cylinder for maintaining the cutter in close proximity thereto.

4. In combination with a doughnut former having a cylinder formed with a discharge outlet, a shaft coaxially journalled with respect to said cylinder, arms secured to said shaft, a wire member secured to said arms and following along the periphery of said cylinder, wire guides extending circumferentially along said cylinder for holding said wire in contact therewith, and means for tensioning said guides.

5. In combination with a doughnut former having a cylinder formed with a discharge outlet, a cutter movable along said cylinder, means for actuating said cutter, and a resilient member for stopping the movement of said cutter prior to the complete passage of the same over said outlet.

6. In combination with a doughnut former having a cylinder formed with a discharge outlet, a cutter movable along said cylinder, means for actuating said cutter, and a resilient member for stopping the movement of said cutter prior to the complete passage of the same over said outlet, said cylinder being movable to complete the relative movement of the outlet and cutter.

7. In combination with a doughnut former having a cylinder provided with a discharge outlet, a cutter movable along said cylinder and across said outlet, means for moving said cutter, and means for retarding the movement of said cutter when partially across said outlet.

8. In combination with a doughnut former having a member provided with a discharge outlet, a cutter movable along said member and across said outlet, and means for moving said cutter across said outlet at two different rates of speed.

9. In combination with a doughnut former having a cylinder provided with a discharge outlet, a shaft coaxially journaled with respect to said cylinder, arms depending from said shaft, a cutter secured to said arms and following along the surface of said cylinder and movable across said outlet for freeing the doughnuts discharged from said outlet, an arm extending outwardly from one of said depending arms, means for causing relative movement of said cylinder and cutter, and retarding means acting upon said outwardly extending arm.

10. In combination with a doughnut former having a cylinder provided with a discharge outlet, a shaft coaxially journaled with respect to said cylinder, arms depending from said shaft, a cutter secured to said arms and following along the surface of said cylinder and movable across said outlet for freeing the doughnuts discharged from said outlet, an arm extending outwardly from one of said depending arms, means for causing relative movement of said cylinder and cutter, and a brake acting upon said outwardly extending arm for retarding the relative movement of said cutter and cylinder.

11. In combination with a doughnut former having a cylinder provided with a discharge outlet, a shaft coaxially journaled with respect to said cylinder, arms depending from said shaft, a cutter secured to said arms and following along the surface of said cylinder and movable across said outlet for freeing the doughnuts discharged from said outlet, an arm extending outwardly from one of said depending arms, a weight connected to said outwardly extending arm for causing relative movement of said cutter and cylinder, and means operating upon said arm for retarding the movement of said cutter and cylinder, said means operating in opposition to said weight.

12. In combination with a doughnut former having a cylinder provided with a discharge outlet, a shaft coaxially journaled with respect to said cylinder, arms depending from said shaft, a cutter secured to said arms and following along the surface of said cylinder and movable across said outlet for freeing the doughnuts discharged from said outlet, an arm extending outwardly from one of said depending arms, a weight connected to said outwardly extending arm for causing relative movement of said cutter and cylinder, and a spring connected to said arm for retarding the movement of said cutter and cylinder, said spring operating in opposition to said weight.

13. In combination with a doughnut former provided with a discharge outlet, a cutter adapted to move across said discharge outlet to free the doughnuts discharged from said outlet, means for moving said cutter and cylinder relative to one another, and friction means for retarding the movement of said cutter.

14. In combination with a doughnut former provided with a discharge outlet, a cutter adapted to move across said outlet to free the doughnuts discharged therefrom, a weight for moving said cutter with respect to said discharge outlet, and resilient means operating in opposition to said weight for retarding the speed of said cutter during a portion of the cycle of movement thereof.

15. In combination with a doughnut former provided with a discharge outlet, a cutter adapted to move across said outlet to free the doughnuts discharged therefrom, a weight for moving said cutter with respect to said discharge outlet, and friction means for retarding the speed of said cutter during a portion of the cycle of movement thereof.

16. In combination with a doughnut former having a cylinder formed with a discharge outlet in the periphery thereof, arms coaxially journalled with respect to said cylinder, a cutter secured to said arms and following along the surface of said cylinder for freeing the doughnuts discharged from said outlet, a dog pivoted to one of said arms, a member on said cylinder for engaging said dog to move the cutter with said cylinder, releasing means operable through the movement of the cutter for releasing said dog therefrom and means for causing relative movement of said cutter and cylinder upon release of the dog from said member.

In testimony whereof we have affixed our signatures to this specification.

FRANK M. ROEHL.
PETER J. TOEWS.